(12) United States Patent
Bialk et al.

(10) Patent No.: US 7,543,328 B2
(45) Date of Patent: Jun. 2, 2009

(54) METHOD AND SYSTEM FOR PROVIDING AN EFFICIENT USE OF BROADBAND NETWORK RESOURCES

(75) Inventors: Harvey R. Bialk, Littleton, CO (US); Jyoti A. Kulkarni, Englewood, CO (US)

(73) Assignee: AT&T Corp., New York, NY (US)

( * ) Notice: Subject to any disclaimer, the term of this patent is extended or adjusted under 35 U.S.C. 154(b) by 1688 days.

(21) Appl. No.: 09/851,285

(22) Filed: May 8, 2001

(65) Prior Publication Data

US 2002/0170069 A1 Nov. 14, 2002

(51) Int. Cl.
 *H04N 7/173* (2006.01)
 *G06F 3/00* (2006.01)
 *G06F 13/00* (2006.01)
 *H04N 5/445* (2006.01)
(52) U.S. Cl. .......................... 725/129; 725/37; 725/107
(58) Field of Classification Search ................. 725/129, 725/107, 37
 See application file for complete search history.

(56) References Cited

U.S. PATENT DOCUMENTS

| 4,972,453 | A | 11/1990 | Daniel et al. |
| 5,513,171 | A | 4/1996 | Ludwiczak et al. |
| 5,519,830 | A | 5/1996 | Opoczynski |
| 5,559,955 | A | 9/1996 | Dev et al. |
| 5,608,447 | A | 3/1997 | Farry et al. |
| 5,640,505 | A | 6/1997 | Hearn et al. |
| 5,761,432 | A | 6/1998 | Bergholm et al. |
| 5,943,318 | A | 8/1999 | Badiee |
| 6,023,775 | A | 2/2000 | Fujii |
| 6,137,793 | A | 10/2000 | Gorman et al. |
| 6,308,174 | B1 | 10/2001 | Hayball et al. |
| 6,490,620 | B1 | 12/2002 | Ditmer et al. |
| 6,711,135 | B1 | 3/2004 | Dziekan et al. |
| 2002/0004390 | A1* | 1/2002 | Cutaia et al. ................. 455/424 |

FOREIGN PATENT DOCUMENTS

EP      0 820 203 A      1/1998

(Continued)

OTHER PUBLICATIONS

European Search Report Communication dated Aug. 31, 2004 for European Patent Application No. EP 02 253 205.5.

(Continued)

*Primary Examiner*—Dominic D Saltarelli
(74) *Attorney, Agent, or Firm*—Brooks Kushman P.C.

(57) ABSTRACT

A hybrid fiber coax (HFC) network management method and system for use in a broadband network having a hybrid fiber coax (HFC) network provided with network elements operable for communicating telephony, data, and video signals with customer-premises equipment (CPE). The network elements include a host digital terminal (HDT) for communicating the telephony signals, a cable modem termination system (CMTS) for communicating the data signals, and video equipment for communicating the video signals; a fiber optics network connecting the HDT, CMTS, and video equipment to a fiber optics node; and a coax cable network connecting the fiber optics node to the CPE. The HFC network management method and system include a service, design, and inventory (SDI) system having a database operable for storing data indicative of an inventory of the network elements and the CPE in the HFC network, for storing data indicative of configuration of the network elements and the CPE in the HFC network, and for storing data indicative of assigned capacity of the HFC network based on the configuration of the network elements and the CPE.

21 Claims, 11 Drawing Sheets

FOREIGN PATENT DOCUMENTS

| | | |
|---|---|---|
| WO | WO 96/38930 A1 | 6/1996 |
| WO | WO 99/15950 A1 | 9/1998 |
| WO | WO 99/15950 A | 4/1999 |
| WO | WO 00/74304 A2 | 4/2000 |
| WO | WO 01/30043 A2 | 10/2000 |

OTHER PUBLICATIONS

Bhatti S.N. et al.: "On Management of CATV Full Service Networks: A Eurpoean Perspective" IEEE Network, IEEE Inc., New York, U.S. vol. 12, No. 5, Sep. 1998, pp. 28-39.

Gardner R. D. et al.: "Pattern Discovery and Specification Techniques for Alarm Correlation" Network Operations and Management Symposium, 1998. NOMS 98., IEEE New Orleans, LA, USA Feb. 15-20, 1998, New York, NY, USA, IEEE, US Feb. 15, 1998, pp. 713-722.

Haritsa J.R. et al.: "Mandate: Managing Networks Using Database Technology" IEEE Journal on Selected Areas in Communications, IEEE Inc., New York, U.S., vol. 11, No. 9, Dec. 1, 1993, pp. 1360-1372.

\* cited by examiner

110

120

METHOD AND SYSTEM FOR PROVIDING AN EFFICIENT USE OF BROADBAND NETWORK RESOURCES

CROSS-REFERENCE TO RELATED APPLICATIONS

This application is related to co-pending application "Network Management Method and System for Managing a Broadband Network Providing Multiple Services" application Ser. No. 09/851,234 filed concurrently, co-pending application "Method and System for Generating Geographic Visual Displays of Broadband Network Data" application Ser. No. 09/850,910 filed concurrently, and co-pending application "Method and System for Provisioning Broadband Network Resources" application Ser. No. 09/851,235 filed concurrently.

TECHNICAL FIELD

The present invention relates generally to broadband networks such as hybrid fiber coax (HFC) networks providing multiple services and, more particularly, to a method and system for providing an efficient use of HFC network resources.

BACKGROUND ART

Broadband networks such as hybrid fiber coax (HFC) networks deliver video, telephony, data, and, in some cases, voice over Internet Protocol (VoIP) services to customers. Unlike traditional twisted pair local distribution networks, an HFC network must be managed to meet the capacity, availability, and reliability requirements of multiple services. Video, telephony, and data services share the same transport infrastructure to the customer's service location. Because this relationship exists, it is important that the set of HFC network management solutions meet the requirements of the HFC network and the requirements of the services transported by the HFC network to customers.

Designing, building, and maintaining an HFC network is complex. An HFC network is made up of discrete geographical units (cable runs which pass a limited number of potential customer sites). These discrete units of customer locations are connected to a specific local fiber node. The head end of the HFC network is located in a control point referred to as a hub office. The hub office can contain its own inventory of HFC network elements and equipment. Thus, there is a need to monitor or control the inventory in the hub office. Second, there is a need to design service links between the HFC network elements and customer-premises equipment in order to communicate telephony, data, and video signals between the HFC network and a customer. Third, there is also a need to provide orders for service adaptations such as service enhancements in the HFC network or the removal or replacement of services.

In the past each of these three categories of information, i.e., inventory, design, and order management have been treated separately for traditional twisted pair local distribution networks. Unlike an HFC network, traditional networks are fully inter-connected. Different databases have been constructed to separately monitor inventory, permit the design of links, and provide for the creation or editing of orders for the traditional networks. However, the distribution of all of this information over multiple databases creates an additional layer of complexity in the control, planning, and maintaining of the traditional networks. Each different database stores information peculiar to that database as well as information which may be of benefit in a number of other databases. Therefore, there is some overlap or redundancy when the databases are considered as a whole. The format of the stored data may vary from database to database thereby severely limiting the ability to exchange appropriate information. In addition, different operators will have access to different information within different databases. It may be necessary for the same operator to have access to two or more of the databases to complete job functions. Under this structure for monitoring and controlling inventory, design, and service orders there is inefficient coordination of these efforts and there is no database provided which promotes the efficient use of the traditional network by considering the related nature of these three general categories of information.

U.S. Pat. No. 5,761,432 describes a Service, Design, and Inventory (SDI) system having a database which promotes the efficient use of the traditional network by considering the related nature of these three general categories of information. However, what is needed is a SDI system having a database which promotes the efficient use of an HFC network by considering the related nature of these three general categories of information. It would be desirable if such an SDI system was configured in an HFC network management system for supporting HFC network provisioning, fault management, and capacity management processes.

SUMMARY OF THE INVENTION

Accordingly, it is an object of the present invention to provide a method and system for providing an efficient use of hybrid fiber coax (HFC) network resources.

In carrying out the above object and other objects, the present invention provides an HFC network management system for use in a broadband network having a hybrid fiber coax (HFC) network having network elements operable for communicating telephony, data, and video signals with customer-premises equipment (CPE) of subscriber households. The network elements include a host digital terminal (HDT) for communicating the telephony signals, a cable modem termination system (CMTS) for communicating the data signals, and video equipment for communicating the video signals; a fiber optics network connecting the HDT, CMTS, and video equipment to a fiber optics node; and a coax cable network connecting the fiber optics node to the CPE of the subscriber households. The HFC network management system includes a service, design, and inventory (SDI) system having a database operable for storing data indicative of an inventory of the network elements and the CPE in the HFC network, for storing data indicative of configuration of the network elements and the CPE in the HFC network, and for storing data indicative of assigned capacity of the HFC network based on the configuration of the network elements and the CPE.

The data indicative of configuration of the network elements may include data indicative of physical and logical connections between the network elements and between the HFC network and the CPE. The SDI system may be operable to generate an SDI report for at least one of a network element and a CPE. The SDI report includes information about the at least one network element and the CPE.

The data indicative of an inventory of the network elements and the CPE may include data indicative of subscriber households passed in the HFC network. The data indicative of subscriber households passed in the HFC network may include for each subscriber household data indicative of the fiber node connected to the CPE of the subscriber household and the coax bus connecting the subscriber household to the fiber node. The data indicative of subscriber households passed in the HFC network may further include for each subscriber household data indicative of household key, household address, and household location.

The data indicative of an inventory of the network elements and the CPE may include data indicative of physical location and identification of the network elements. The data indicative of an inventory of the network elements and the CPE may include data indicative of profiles of the network elements and the CPE.

The HFC network management system may further include an HFC network manager operable for controlling the configuration of the network elements and the CPE in the HFC network. The database of the SDI system updates the stored data indicative of the configuration of the network elements and the CPE in the HFC network in response to the HFC network manager changing the configuration of the network elements and the CPE in the HFC network.

The HFC network management system may further include a fault manager having an alarm visualization tool operable with the database of the SDI system for generating visual displays of the configuration of the network elements and the CPE in the HFC network.

The HFC network management system may further include an online provisioning application link (OPAL) operable with the database of the SDI system for provisioning network elements with CPE based on the assigned capacity of the network elements.

Also, in carrying out the above object and other objects, the present invention provides an associated HFC network management method.

Further, in carrying out the above object and other objects, the present invention provides a system for providing efficient management of hybrid fiber coax (HFC) network resources including an operations center, a server, and a network connecting the operations center to the server. The server includes an HFC network order manager for order management of HFC services provided by the HFC network, an HFC network inventory manager for inventory management of HFC network elements and customer-premises equipment within the HFC network, and an HFC network design manager for design management of the HFC network elements and the customer-premises equipment within the HFC network.

The HFC network inventory manager may include means for tracking the use of and availability of HFC network elements and CPE. The HFC network order manager may include means for tracking the orders for HFC services.

The above object and other objects, features, and advantages of the present invention are readily apparent from the following detailed description of the best mode for carrying out the present invention when taken in connection with the accompanying drawings.

DETAILED DESCRIPTION OF THE DRAWINGS

Figure 1:
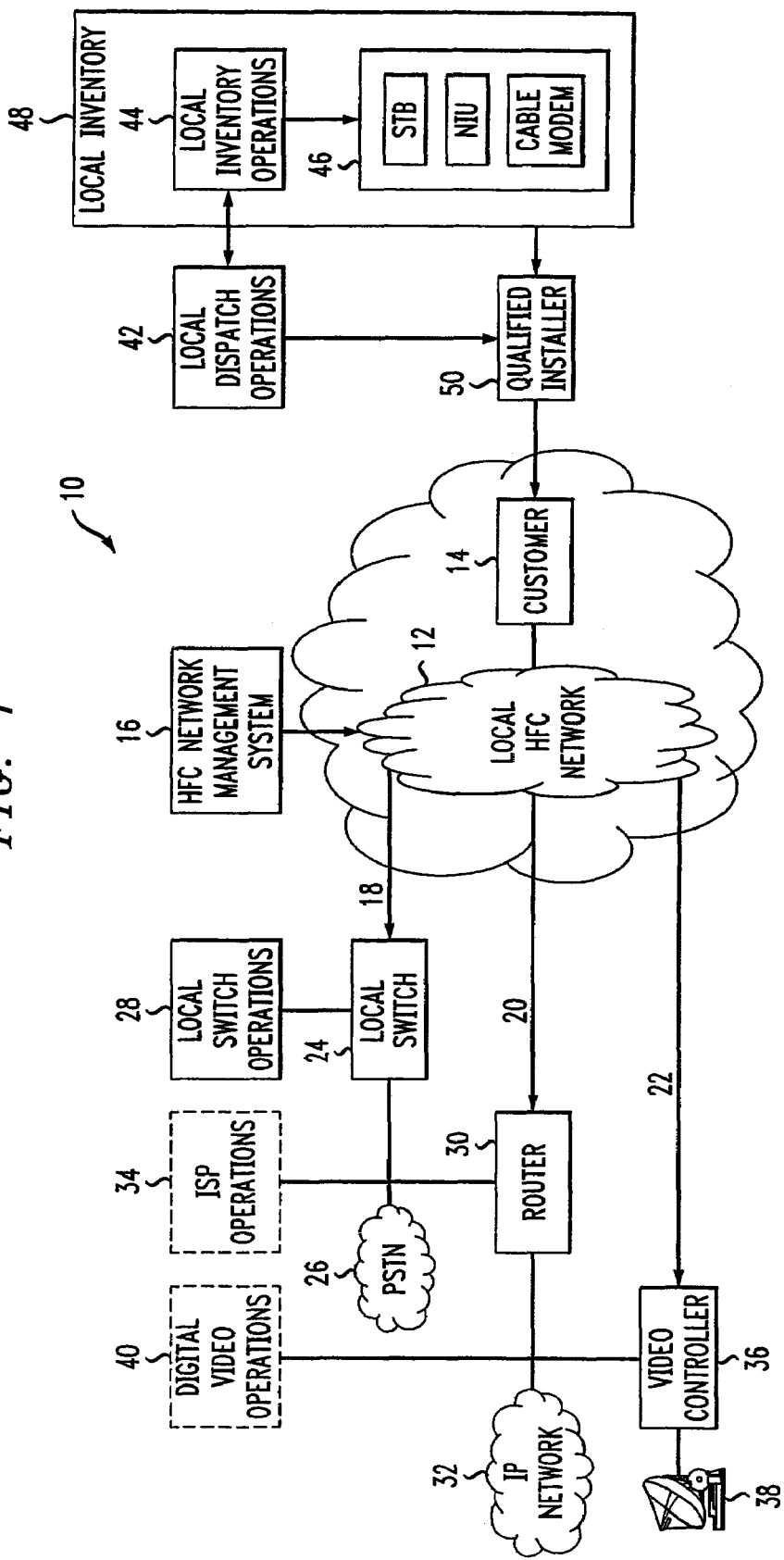
FIG. 1 illustrates a simplified block diagram of a broadband network having a hybrid fiber coax (HFC) network in accordance with a preferred embodiment of the present invention.

Referring now to FIG. 1, a broadband network 10 in accordance with a preferred embodiment of the present invention is shown. Broadband network 10 includes a hybrid fiber coax (HFC) network 12 for distributing telephony, data, and video (and voice over Internet Protocol (VoIP)) services to a customer 14 connected to the HFC network. An HFC network management system 16 is operable with HFC network 12 for managing the HFC network. In general, HFC network management system 16 focuses on the provisioning, maintenance, and assurance of telephony, data, video and VoIP services over HFC network 12 for a customer 14. HFC network management system 16 provides automated system capabilities in the areas of HFC services, network element provisioning, and fault management.

HFC network 12 is operable for receiving and transmitting telephony, data, and video signals from/to a telephony service network 18, a data service network 20, and a video service network 22. HFC network 12 distributes telephony, data, and video signals from respective networks 18, 20, and 22 to a customer 14 connected to the HFC network. Telephony service network 18 includes a local switch 24 for connecting the public switched telephone network (PSTN) 26 to HFC network 12 and a local switch operations center 28 for controlling the local switch. Similarly, data service network 20 includes a data router 30 for connecting an Internet Protocol (IP) data network 32 to HFC network 12 and an Internet Service Provider (ISP) operations center 34 for controlling the router. Video service network 22 includes a video controller 36 for connecting a video source 38 to HFC network 12 and a video operations center 40 for controlling the video controller.

Customer 14 includes customer-premises equipment (CPE) elements for connecting with HFC network 12 to receive/transmit the telephony, data, and video signals. A local dispatch operations center 42 assists in provisioning the desired network elements to customer 14. Local dispatch operations center 42 communicates with a local inventory operations database 44 to select a desired (CPE) element 46 stored in a local inventory 48. Such CPE elements 46 include a set-top box (STB) for data service, a network interface unit (NIU) for telephony service, and a cable modem for data service. A qualified installer 50 receives instructions from local dispatch operations center 42 for installing a desired CPE element 46 stored in local inventory on the premises of customer 14.

Figure 2:
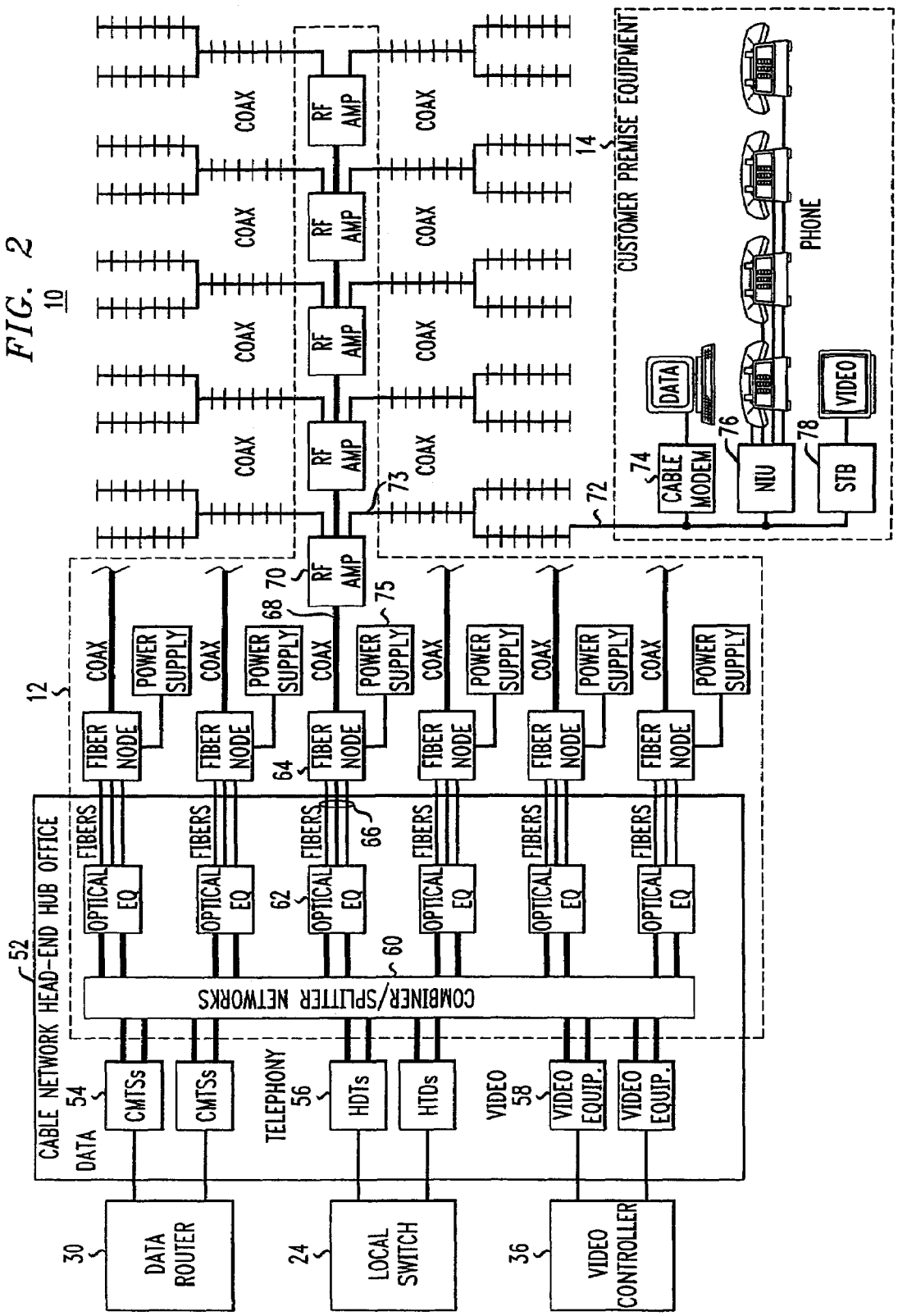
FIG. 2 illustrates a more detailed view of the broadband network shown in FIG. 1.

Referring now to FIG. 2, a more detailed view of broadband network 10 is shown. Broadband network 10 includes a cable network head-end/hub office 52. Data router 30, local switch 24, and video controller 36 are operable with hub office 52 to transmit/receive data, telephony, and video signals to/from customer 14 via HFC network 12. Hub office 52 includes a cable modem termination system (CMTS) 54 for communicating data signals such as IP data to/from data router 30; a host digital terminal (HDT) 56 for communicating telephony signals to/from local switch 24; and video equipment 58 for communicating video signals to/from video controller 36.

The head end of HFC network 12 is located within hub office 52 and connects with CMTS 54, HDT 56, and video equipment 58 for distributing the data, telephony, and video signals to/from customer 14. Specifically, HFC network 12 includes a combiner/splitter network 60 connected to CMTS 54, HDT 56, and video equipment 58. For communicating signals to customer 14, combiner/splitter network 60 combines the data, telephony, and video signals into a combined signal and provides the combined signal to optical equipment 62. Optical equipment 62 (such as a primary or secondary hub ring) converts the combined signal into an optical signal and distributes the combined optical signal to a fiber node 64 via optical fibers 66. Fiber node 64 is generally located in the neighborhood of customer 14. A typical fiber node serves up to 1,200 customers and is powered by a power supply 75. Power supply 75 generates status information and has a transponder for communicating the status information to HFC network management system 16. Fiber node 64 converts the combined optical signal into a combined electrical signal for distribution on coaxial cable 68 located in the neighborhood of customer 14. An amplifier 70 amplifies the combined electrical signal and then provides the combined electrical signal to a coax node bus 73 and a port 72 associated with customer 14.

Customer 14 includes CPE such as a cable modem 74, a network interface unit (NIU) 76, and a set-top box (STB) 78. Cable modem 74 extracts the data signal from the combined electrical signal; NIU 76 extracts the telephony signal from the combined electrical signal; and STB 78 extracts the video signal from the combined electrical signal. In order to communicate signals from customer 14 to hub office 52 for receipt by data router 30, local switch 24, and video controller 36, the signal flow process is reversed and combiner/splitter network 60 in hub office 52 splits the signal from the customer to the appropriate service network (data, telephony, or video).

Figure 3:
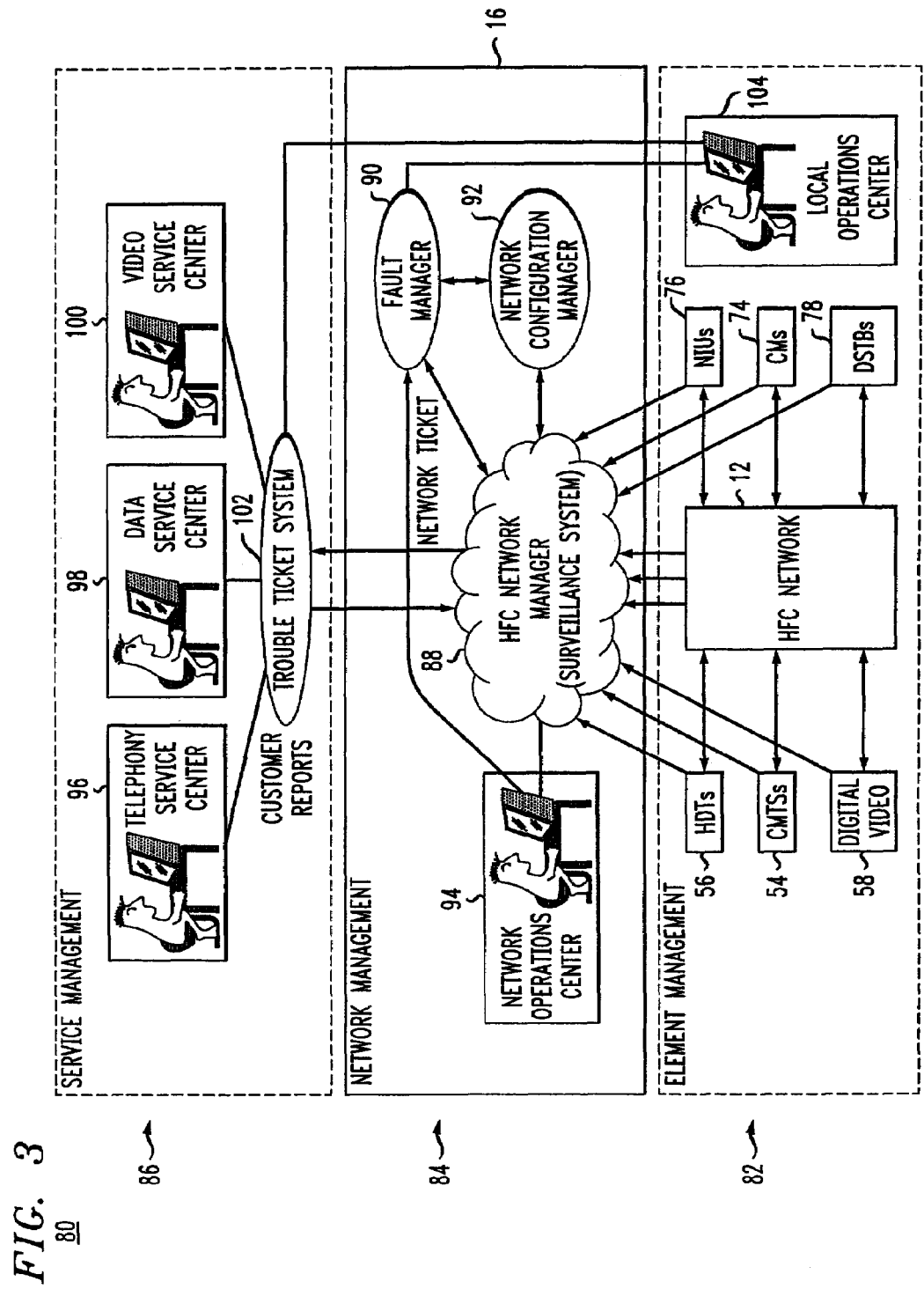
FIGS. 3 and 4 illustrate the Telecommunications Managed Networks (TMN) model of the HFC network management system in accordance with the present invention.

Referring now to FIG. 3, a model 80 implementing HFC network management system 16 is shown. In general, the system capabilities within HFC network management system 16 are designed to adhere to the Telecommunications Managed Networks (TMN) model of the International Telecommunications Union. In accordance with the TMN model, model 80 includes an element management layer 82, a network management layer 84, and a service management layer 86. The service and provisioning systems provided by HFC network management system 16 spans all three management layers 82, 84, and 86.

Element management layer 82 is the physical equipment layer. Element management layer 82 models individual pieces of equipment such as HDTs 56, CMTSs 54, video equipment 58, cable modems 74, NIUs 76, and STBs 78 along with facility links in HFC network 12. Element management layer 82 further models the data and processes necessary to make the equipment and facility links provide desired functionality. Element management layer 82 passes information to network management layer 84 about equipment problems, and instructions are received by the network management layer to activate, modify, or deactivate equipment features.

Network management layer 84 includes network management system 16. Network management system 16 generally includes a network manager 88, a fault manager 90, a network configuration manager 92, and a network operations center (NOC) 94 as will be described in greater detail below. Network management layer 84 deals with the interfaces and connections between the pieces of equipment. As such, network management layer 84 breaks down higher-level service requests into actions for particular systems required to implement these requests. Without a connectivity model, individual equipment systems are merely islands that must be bridged by human intervention.

Service management layer 86 associates customers 14 with services provided by HFC network 12. Business service centers such as telephony service center 96, data service center 98, and video service center 100 are the primary part of service management layer 86 because they allow customers to request service. The provisioning activity originates from service management layer 86. Service management layer 86 further includes a trouble ticket system 102 for issuing trouble tickets to a local operations center 104.

In general, model 80 illustrates the systems and interfaces that support the functions of HFC network management system 16 with respect to HFC network 12 and the services that are provided by the HFC network. These functions, together with processes and systems, support business requirements such as HFC automated provisioning, automated trouble ticket creation and handling, and automated data analysis and reporting.

The functions of HFC management system 16 generally include HFC network-specific functions, services-specific network management functions, and HFC network- and services-specific functions. The HFC network specific functions are status monitoring (surveillance), HFC network management, fault management (alarm correlation and trouble isolation), and performance management. The services-specific network management functions are network capacity management, service assurance (trouble ticketing and administration), network element management (elements are service-specific, e.g., HDTs support telephony service, CMTSs support data services, etc.), performance management, and system management (routers). The HFC network- and services-specific functions are configuration management and provisioning.

The processes and systems related to the functions of HFC management system 16 include sources of network topology data, network inventory and configuration management, network and services provisioning, network surveillance, network alarm correlation, network fault management, capacity management, service assurance, HFC telephony, data, and video element management systems, and system management.

By integrating the functions, processes, and systems described above HFC network management system 16 can support various integrated applications. These integrated applications include automated HFC provisioning for telephony services, auto trouble ticket creation, visual outage correlation, and customer service representation.

Figure 4:
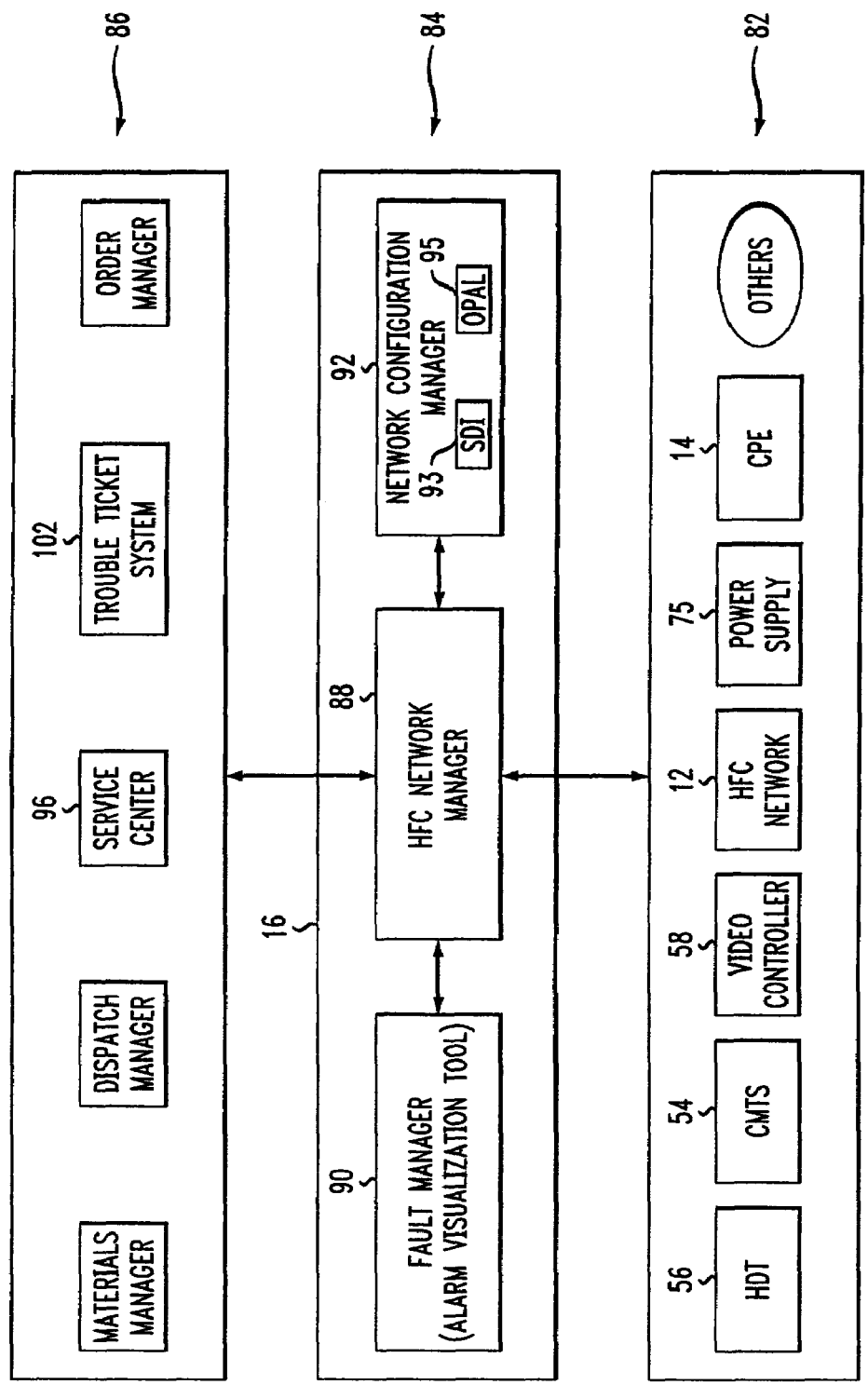

Referring now to FIG. 4, a block-level illustration of HFC network management system 16 implementation of the TMN model is shown. As described with reference to FIG. 3, element management layer 82 includes network elements 54, 56, and 58, HFC network 12, power supply 75, customer-premises elements 14, and other equipment. Element management layer 82 provides status information regarding these elements to HFC network manager 88 of HFC network management system 16 located in network management layer 84.

HFC network manager 88 provides instructions to element management layer 82 on how to configure the elements located in the element management layer. HFC network manager 88 also provides information to service management layer 86 regarding the configuration of the elements within the element management layer and whether there are any problems with the configuration.

In general, HFC network management system 16 provides mechanization and automation of operation tasks for HFC network 12. In order to support these operation tasks, network management layer 84 of HFC network management system 16 includes HFC network manager 88, a fault manager 90, and a network configuration manager 92. Fault manager 90 includes a geographical information system tool referred to herein as an alarm visualization tool (AVT). AVT 90 supports visual correlation of network elements and customer impact. Network configuration manager 92 includes a service, design, and inventory (SDI) system 93 having a database representing HFC network 12. The database of SDI system 93 stores data representing the assigned capacity of HFC network 12. Network configuration manager 92 further includes an online provisioning application link (OPAL) 95. OPAL 95 accommodates automated provisioning of services to customers. The association of HFC system- and service-specific network elements and associated facilities provides surveillance and fault management tools that aid NOC 94 and local operations center 104 to respond to service affecting network events.

A brief overview of the main components in model 80 will now be described. Trouble ticket system 102 of service management layer 86 is used to support customer trouble management and the fault management process of HFC network management system 16. Trouble ticket system 102 supports all services (telephony, data, and video) and automated data collection for analysis and reporting systems. Interfaces to HFC network manager 88 and SDI system 93 are implemented to support network-generated tickets and field maintenance trouble referrals.

AVT 90 demonstrates and verifies the applicability of graphical visualization of HFC network 12 and service alarms. AVT 90 includes capabilities for assisting telephony, video, and data maintenance operations in the trouble sectionalization, isolation, and resolution process. AVT 90 provides geographical displays with varying zoom levels (from country to street and household level) overlaid with node boundary, distribution plant layout, and equipment at single-dwelling unit (SDU) and multiple-dwelling unit (MDU) premises. The views of AVT 90 also represent switch and head end locations, associated hubs, secondary hubs, and connectivity between them. Alarm and status information are shown via color codes and icon size of the equipment representations. AVT 90 displays ticket indicators as representations (icons) separate from alarms. Through these geographical views an operator will be able to visually correlate event information. AVT 90 also assists operators in initiating trouble resolution processes via the ability to launch trouble tickets from the displays. AVT 90 also allows context sensitive access to diagnostics.

HFC network manager 88 supports the alarm surveillance and fault management process. HFC network manager 88 includes a rules-based object-oriented system to support auto ticket creation through trouble ticket system 102 and a geographic information system for visual correlation and alarm correlation with support from SDI system 93.

SDI system 93 is a network configuration management application that supports HFC network provisioning, fault management, and capacity management processes. The database of SDI system 93 also serves as the database of record for supporting the alarm correlation of the fault management process. OPAL 95 provides auto provisioning functionality with the assistance of the database of SDI system 93.

HFC Network-Specific Functions

The network-specific functions are functions that are common to HFC network 12 regardless of the services (telephony, data, video) that are offered by HFC network.

1. Status Monitoring

Status monitoring for the HFC plant includes telemetry information and is deployed in all power supplies and fiber nodes. This technology contributes to network availability by enabling preemptive maintenance activities to head off network outages. Status monitoring alerts are useful in detecting problems with standby inverter batteries. This alone enables proactive maintenance to ensure the ability to ride through short-duration electric utility outages. Alerts from cable plant power supplies also determine when standby generators should be deployed to maintain powering through long-duration commercial power outages. Upstream spectrum management systems are deployed to accept autonomously generated messages that indicate a degraded condition in the upstream bands. Fundamentally, these systems are spectrum analyzers with the capability of masking normal spectrum behaviors from abnormal conditions and reporting such abnormalities.

2. Network Management

HFC network manager 88 supports fault management functions for HFC network 12. Included in the supported fault management functions are surveillance of the HFC outside plant, message filtering, basic alarm management (e.g., notify, clear, retire alarms), and test access support. HFC network manager 88 also supports visual alarm correlation, management of some provisioning command execution, and exporting status and traffic information to network operations center 94.

HFC network manager 88 aggregates device fault information and includes a software system that allows development of message-processing rules and behaviors. HFC network manager 88 includes standard modules for communicating with any network protocol. The software resides on a server in each local market. This ensures scalability, reliability, local visibility, fault location, and a distributed computing environment. The numerous connectivity capabilities ensure that HFC network manager 88 can communicate with AVT 90, SDI system 93, and OPAL 95.

HFC network manager 88 is the primary tool available to technicians of network operations center 94. Because HFC network manager 88 interfaces to the various vendor-provided element management systems, the HFC network manager provides a uniform view for network operations center 94 into those systems. This insulates the technicians from each piece of equipment that has its own particular management system and protocol. Additionally, the current fault rule sets perform one universal function of displaying faults as messages are received and clearing the fault when a corresponding clear is received. This contrasts with many vendor element management systems which provide a continuously streaming arrays of messages where faults and clears are shown on the same screen sorted by time only.

Because HFC network manager 88 is a rules-based system, the HFC network manager can implement advanced criteria designed by network and equipment subject-matter experts into tangible behaviors described below. Such behaviors are a powerful tool for managing the projected numbers of faults.

3. Fault Management

Prior to HFC network management system 16, manual correlation of information available from network elements was used to isolate problems. Incoming alarms were read from tabular listings on multiple workstations. Additional information was then obtained about location and serving area from databases, maps, and spreadsheets. Trouble tickets were reviewed to see if related customer problems existed. This method demonstrated the effectiveness of correlation, but is very time consuming and may result in details being overlooked due to the manual nature of the process.

The present invention provides enhanced correlation methods for fault management through a strategy that combines automated, visual, and cross product correlation of customer-reported problems and status information from intelligent network elements. The present invention presents this information in an automated user friendly fashion, network managers can quickly isolate problems in the network as to their root cause and location.

HFC network manager 88 is the data collection and processing engine for telephony, data, and video equipment. Alerts from element managers and customer-reported problem data from trouble ticketing system 102 are managed by HFC network manager 88. HFC network manager 88 processes these alerts against predefined rule sets to perform advanced correlation. HFC network manager 88 dips into the database of SDI system 93 to look up the logical relationships and service address information that the calculations require. HFC network manager 88 stores the results from the correlation processing in a database.

AVT 90 is used in parallel to automated event correlation. AVT 90 includes a spatial database that relates alarm information from HFC network manager 88 with network configuration data from the database of SDI system 93, geo-coded homes passed information, and landbase and spatial data. AVT 90 is a web-based graphics tool that allows network operations center 94 to view real-time status of faults in broadband network 10. This maximizes the efficiency and effectiveness of network operations center 94 in identifying telephony alarms and correlation of these alarms to customer proximity, plant and equipment proximity, and connectivity proximity for the resolution of alarms, problems, and customer service.

The following sections describe how automated correlation along with visual and cross-product correlation is performed in accordance with a preferred embodiment of the present invention. In addition, the description of reports that are generated by SDI system 93 in support of the fault management is provided.

a. Automated Correlation

Systems that can perform automated correlation of managed elements are needed to establish associations between problems with customer's service and the equipment that delivers those services. In order to perform automated correlation, logical connectivity relationships need to be established between the elements of broadband network 10 and the common equipment and transmission paths. A database (i.e., the database of SDI system 93) representing the local network connectivity (HFC infrastructure) and the elements connected to the network will enable the delivery of services (telephony, data, and video) to a customer location. This database is needed as a source of reference for HFC network management system 16. In order to support fault management capability through automated correlation, the database of SDI system 93 must be an accurate database. The database of SDI system 93 models and inventories head end equipment, fiber node, and CPE. Connectivity and serving area information for this equipment is established as part of the provisioning process for advanced services.

b. Visual Correlation

Visual correlation enables network operations center 94 to relate the location of faulted CPE with HFC network 12 feeding them. AVT 90 displays street maps of the regions that have been overlaid with HFC cable plant diagrams. These maps also show the serving area boundaries for each fiber node. In addition to this static information, color-coded dynamic symbols representing type of service, status of intelligent network elements, and the customer reported problems are also displayed. Geo-coding of network elements and customer service addresses enables the symbols to be accurately located on the maps relative to the streets and physical plant. This method quickly presents a visual indication of services that are experiencing problems and the location of customers impacted.

c. Cross-Product Correlation

Correlation is significantly more powerful when multiple services are provided. By determining if one or more products in the same section of the network are experiencing problems or are operating normally, common equipment and transmission paths can be identified and eliminated as the trouble source.

Figure 5:
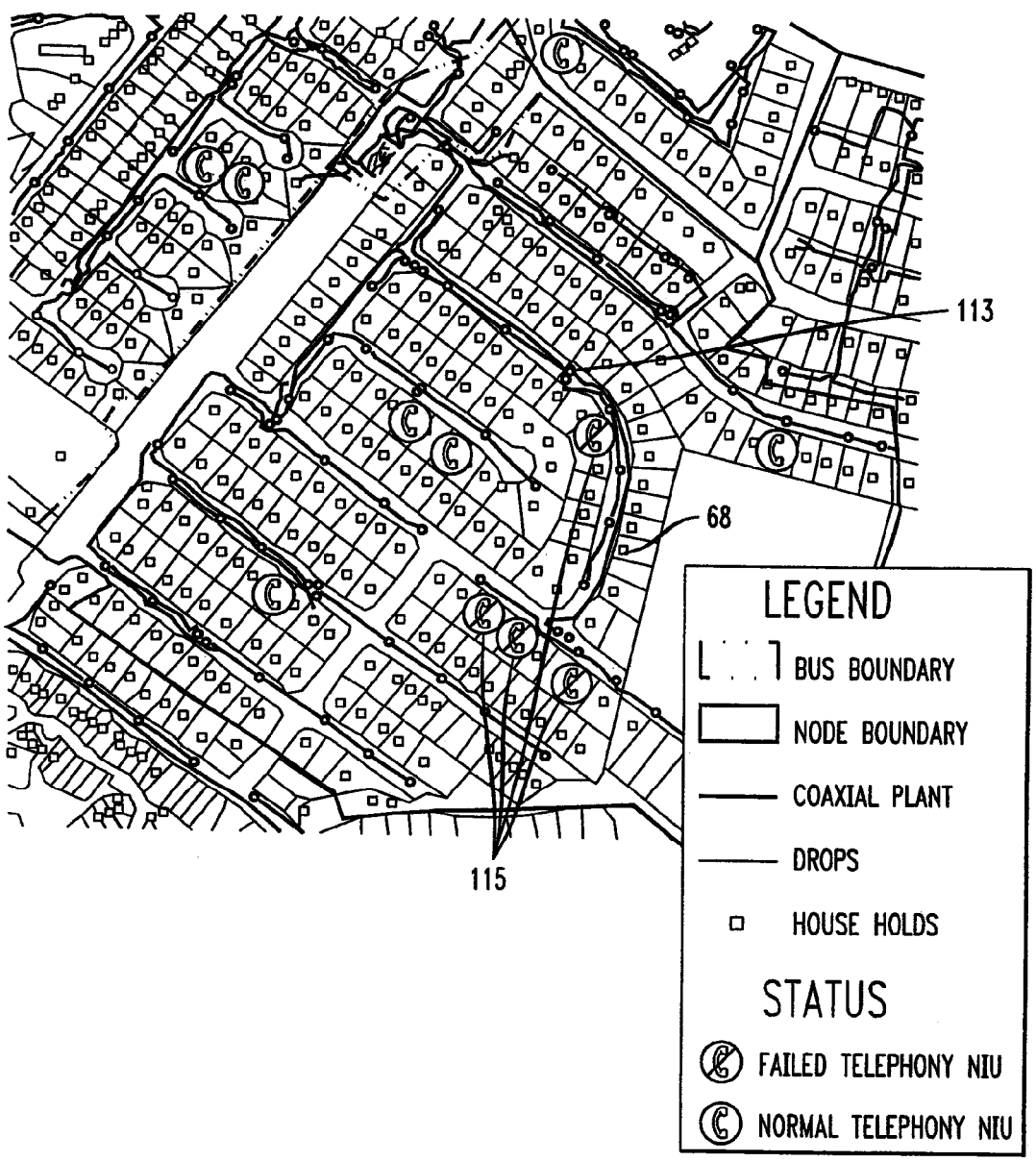
FIGS. 5, 6, and 7 illustrate examples of visual correlation displays generated by the alarm visualization tool of the HFC network management system.

FIG. 5 illustrates an example of a visual correlation display 110 of some failed telephony NIUs 115 generated by AVT 90. Display 110 provides a great deal of information about the location of a telephony problem. In addition to the failed telephony NIUs 115, display 110 shows the importance of knowing what is in the normal state. In display 110 it is still uncertain if the problem is in cable plant 68 or head end 52. It appears that a single amplifier 113 feeds all the failed telephony NIUs 115.

Automated correlation information can further isolate the problem by indicating if the same modem equipment in head end 52 serves all the failed cable modems 127. It could also indicate if any working cable modems 125 are served by the same modem equipment in head end 52. If they are not, or there are working devices off that same modem equipment in head end 52, then it is likely that the problem is in cable plant 68. If they are served by the same modem equipment in head end 52, then trouble location is not certain. Additional information from other products could contribute in further isolating the problem.

Figure 6:
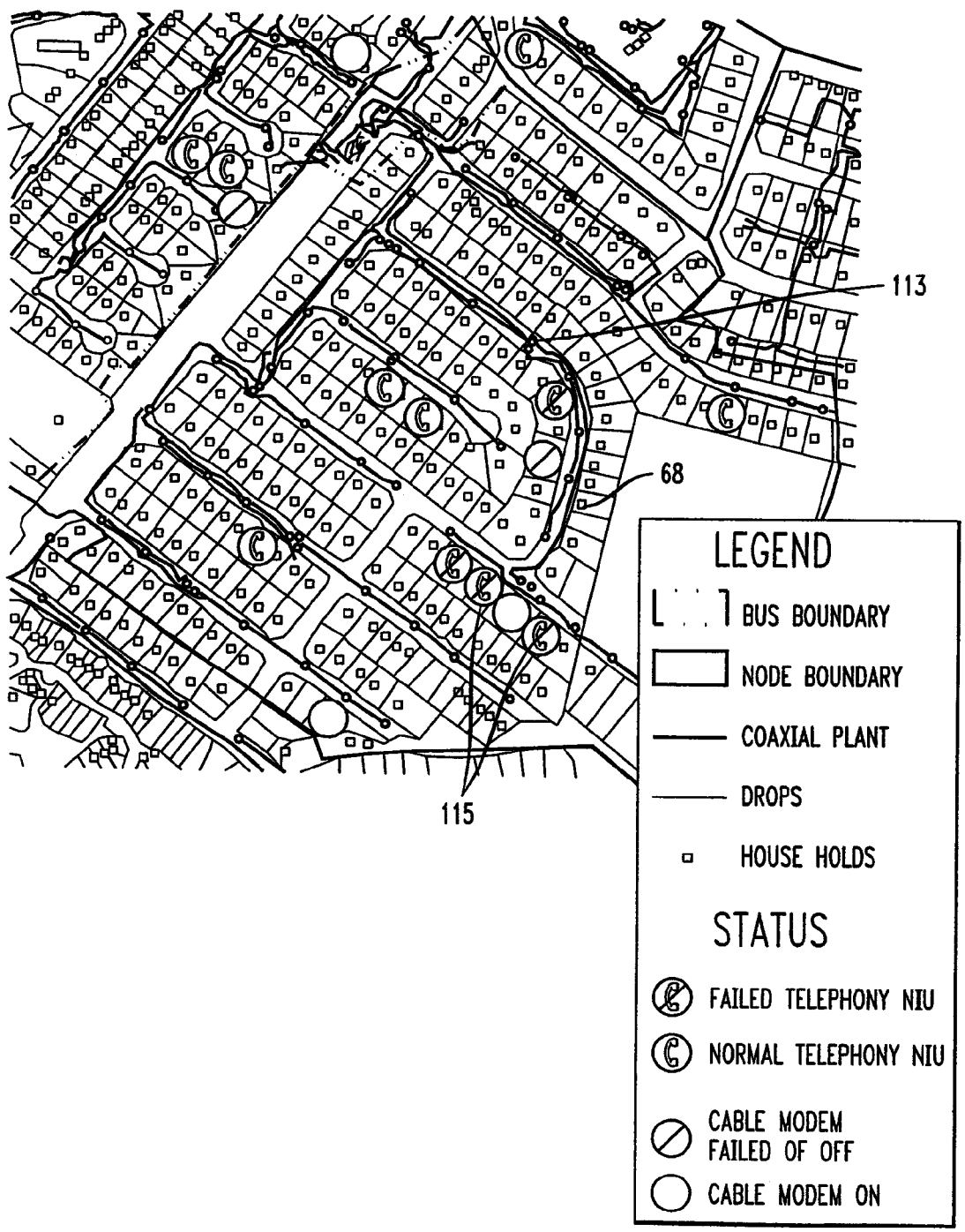

FIG. 6 illustrates a second visual correlation display 120 generated by AVT 90. Display 120 includes Internet cable modem status information. Correlation can now be made against cable modems 125 and 127. In the area of the failed telephony NIUs 115 there is one operating cable modem 125. Even though other modems in the node are turned off this one piece of information indicates that cable plant 68 serving this area may be properly functioning. Looking for trouble at head end 52 may make more sense than sending a technician to look for line problems, particularly if all the failed telephony devices 115 are off the same cable modem equipment in head end 52.

In addition to the alarm data from the intelligent network elements, trouble ticketing system 102 provides the address and trouble type information from customer-reported problems. This is also displayed on the mapping system. The report clusters from this source can be useful in identifying soft failures, degradation, or content problems that are not accompanied by active elements but impact service.

Figure 7:
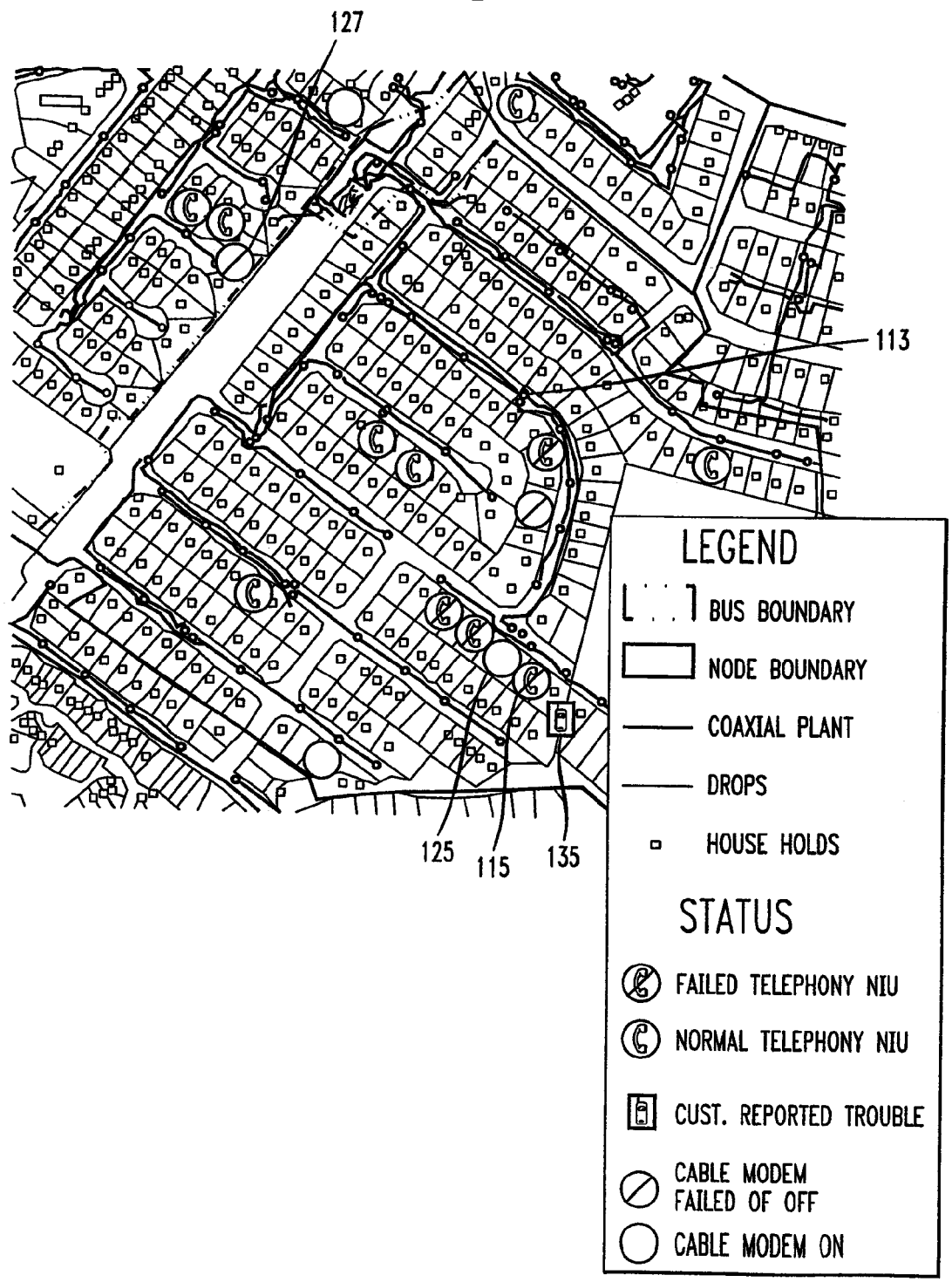

FIG. 7 illustrates a third visual correlation display 130 generated by AVT 90 which includes a new symbol 135 that indicates customer-reported troubles. Visual or automated correlation desirably includes all elements in HFC network 12 which could possibly become single points of failure for different services or service areas. This includes network elements which are physically but not logically related. For example: fiber facilities between the hub and the head end are not protected and are typically bundled with other node facilities. Automated or visual correlation must be able to identify those common points of failure which could affect several nodes 64, such as a fiber cut or failure of a power supply 75 which serves all or parts of several nodes. The plant database must include knowledge of fiber for different nodes 64 sharing a common fiber bundle 66.

d. Reports from the SDI System in Support of Fault Management

Referring back to FIGS. 1-4, SDI system 93 provides query capability that includes two primary queries. One is a query by phone number, customer 14 name, service address, or NIU 76 serial number. The returning data would be customer 14 name, service address, latitude and longitude, each NIU 76 serving that customer and associated NIU serial number, telephone number associated with each port 72 on the NIU, fiber node 64, and HD. The second query would be a query by fiber node 64 or HDT 56. The returning data would be a list of customers and all NIUs 76 associated with customer 14.

Services-Specific Network Management Functions

The services-specific network management functions are those functions that are network management functions but are service-specific and are different for different services.

1. Network Capacity Management

Capacity management is a high-priority function because HFC network 12 supports advanced services (telephony, data, and video). There are four major components for telephony capacity management: 1) fixed capacity (voice ports) based on concentration per head end modem node and NIUs 76; 2) fixed capacity between HDT 56 and the local switch including interface group management; 3) capacity based on traffic pattern and analysis; and 4) customer reference value allocation and management. In the case of direct connect MDUs, capacity issues resolve around: 1) channel allocation, 2) transport capacity to local switch 24, 3) capacity based on traffic pattern and analysis, and 4) customer reference value allocation and management. The major components for data capacity management include: 1) fixed capacity based on the technology platform, 2) capacity based on traffic pattern and analysis, and 3) fixed capacity between CMTSs 54 and data service providers 32.

For telephony capacity management, SDI system 93 has telephony services modeled in its database. Based on business rules which govern the number of customers provisioned per head end modem, fixed capacity is derived. This measurement is used for example for capacity planning and for adding additional capacity to a hub.

2. Service Assurance (Trouble Ticketing and Administration)

Trouble ticketing system 102 in conjunction with HFC network management system 16 provides for a robust and efficient service assurance capability having improvements in system to human interface, system-to-system interoperability with other trouble ticketing systems, data storage systems and technician dispatch workflow systems, and network element management systems. Primary goals include automation of all aspects of trouble ticket generation, flow management, and closure to include escalation and event notification. A short cycle implementation of easily designed and modified schemas, data field sets, and report queries that can be managed by network operator administrators meet the requirement to support a dynamic operational and business environment. A peer-to-peer distributed server architecture with synchronized data storage is used to ensure performance and redundancy as concurrent user and managed network elements scale to an estimated 1000 operators and 45 million objects respectively.

Trouble ticketing system 102 includes a rules-based trouble management system software application that maximizes operational efficiencies through field auto population, rules-based ticket workflow, user and management team maintenance of trouble, solution and script text, markets, organizations, and user data. Trouble ticketing system 102 integrates with HFC network manager 88 for automatic trouble ticket generation. HFC network manager 88 identifies and locates alarms and modifies data fields based on rules/tables, opens and auto-populates applicable data fields, or closes a trouble ticket.

3. Network Element Management

HFC network manager 88 communicates with element managers regarding network elements. HFC network manager 88 gathers performance, alarm, and use data from network equipment and communications facilities. HFC network manager 88 also distributes instructions to network elements so those maintenance tasks such as grooming, time slot assignment, provisioning, and inventory are performed from a central location.

HFC Network- and Services-Specific Functions

The HFC network- and services-specific functions are not separable into network related functions or services-specific functions. For example, for telephony service, the provisioning and configuration management cannot be broken out into network and services. This is because in the case of telephony service, until NIU 76 is installed, network configuration and provisioning is not complete. This is because NIU 76 is a managed network element and it is really port 72 off of the NIU that is activated during the service-provisioning process. Currently, for new service orders, the installation of an NIU 76 takes place only after the service is ordered (i.e., as a task related to service provisioning). The service configuration and provisioning takes place after NIU 76 is installed and a port 72 on the NIU is assigned for the telephony service.

1. Configuration Management

Figure 11:
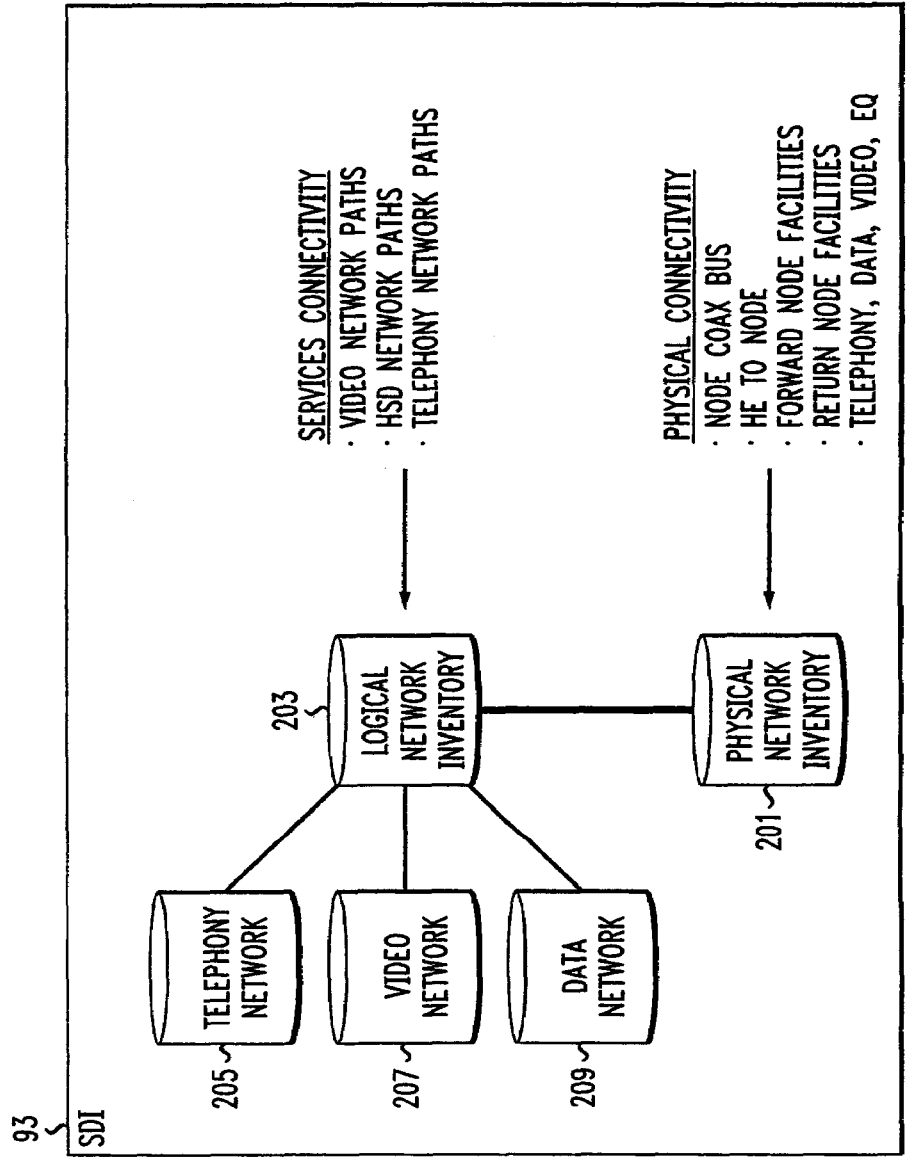
FIG. 11 illustrates the components of the database of the SDI system in accordance with a preferred embodiment of the present invention.

Referring now to FIG. 11, the database of SDI system 93 has two components for configuration management: 1) a physical network inventory 201 and 2) a logical network inventory 203. Physical network inventory 201 is the inventory of actual network equipment (physical) and logical network inventory 203 describes how that equipment is configured and connected (physical and logical) for each of telephony network database 205, video network database 207, and data network database 209. The configuration information is vital to automate the provisioning process and perform effective fault management.

SDI system 93 is an object-oriented software system that does network inventory management and design management (circuit design). SDI 93 system defines and tracks a customer's network service path from customer location to the HDTs 56 (and other network elements). SDI system93 provides strict referential integrity for network equipment, network connectivity, customer's network service path, and services that are provisioned via this network service path.

The database of SDI system 93 models HFC network 12 using a data-rule structure. The data-rule structure represents the equipment, facilities and service links, and provisioned telephony customers. The data structure further represents links between HDTs 56 and fiber nodes 64, NIUs 76, customer location, and aggregate links from the HDTs to the NIUs at customer 14 locations. The telephony serviceable household passed (HHP) data defines the base geographic units (cable runs) in the database of SDI system 93. The HHP data is accurately geo-coded including the relation of address location to fiber node 64, coax cable run 68, and latitude and longitude. The data-rule structure demonstrates the ability to capture the basic elements and relationships of HFC network 12 to support the NOC fault management process. The database of SDI system 93 associates each telephony-ready household passed address to a fiber node 64 and coax cable bus 68 associated with this address. The database of SDI system 93 includes the data elements required to support the provisioning process and provides report capability to support network management alarm correlation and fault management.

SDI system 93 supports network inventory and topology data and acts as a configuration system that allows for changes to be made to the network. Significant changes to the network can be entered through a batch load process and small changes can be entered using a GUI interface. The data is needed from various sources such as engineering data (equipment and cable links), HHP data along with association of house to fiber node 64 and coax cable bus 68 it is served by, and data associated with customers 14 that were provisioned prior to SDI system deployment. The HHP data includes house key, address, latitude, longitude, fiber node 64, coax cable bus 68, hub 52 number, power supply 75, etc. Significant effort is involved in associating a house (customer 14) to a fiber node 64. It involves correcting landbase for a market so that latitudes and longitudes are correct. The fiber node boundaries are drawn on engineering drawings (at coax bus level) so that association of a customer 14 to a fiber node 64/coax bus 68 can be made.

The equipment location data includes location for fiber nodes 64 and hubs 52 with addresses, latitudes, and longitudes. The equipment data includes equipment profiles and equipment inventory such as HDTs 56, fiber nodes 64, forward and return paths, etc. The network cabling data includes data determined by system architecture and actual cabling inventory and includes relationships of node/forward path/reverse paths, laser transmitters and receivers, and power supplies. The network aggregate link data is based on equipment, cable inventory, and network architecture.

The equipment location data includes location for fiber nodes 64 and hubs 52 with addresses, latitudes, and longitudes. The equipment data includes equipment profiles and equipment inventory such as HDTs 56, fiber nodes 64, forward and return paths, etc. The network cabling data includes data determined by system architecture and actual cabling inventory and includes relationships of fiber node 64 forward paths/reverse paths, laser transmitters and receivers, and power supplies 75. The network aggregate link data is based on equipment, cable inventory, and network architecture.

Figure 8:
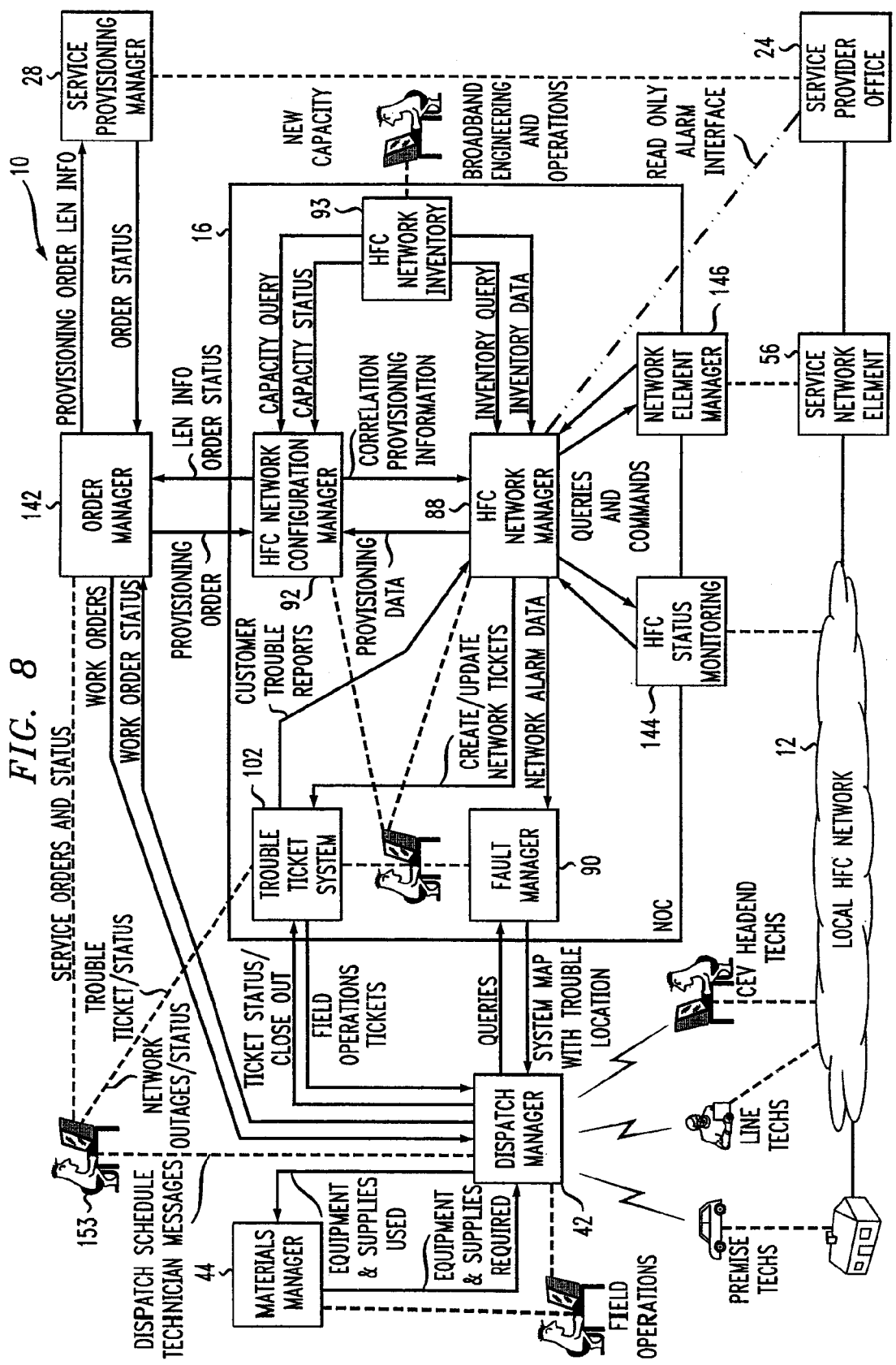
FIG. 8 illustrates a highly detailed view of the HFC network management system and the broadband network.

Referring now to FIG. 8, a highly detailed view of HFC network management system 16 within a broadband network environment is shown. In general, the applications of HFC network management system 16 normalize the variables existing in HFC network 12 so as to allow the definition and support of provisioning and maintenance interfaces to the service management layers. The interfaces and set of service delivery processes and functions established are reusable for telephony, data, and video services because the same set of functions need to occur and only the rules are different based on the service enabling network elements. This implies that any network management system application desirably is an object-based, component architecture solution which is rules- and tables-driven to provide the flexibility and scale to address a high-capacity multiple-services network element environment. The goal of HFC network management system 16 is to integrate and automate system support such that human intervention is minimally needed.

FIG. 8 represents a set of component systems and interfaces that are necessary to achieve integrated network management and automated HFC provisioning, automated trouble ticket generation, and automated fault management capabilities in a broadband network having an HFC network 12. As introduced above, these are three key network management functions performed by HFC network management system 16.

Figure 9:
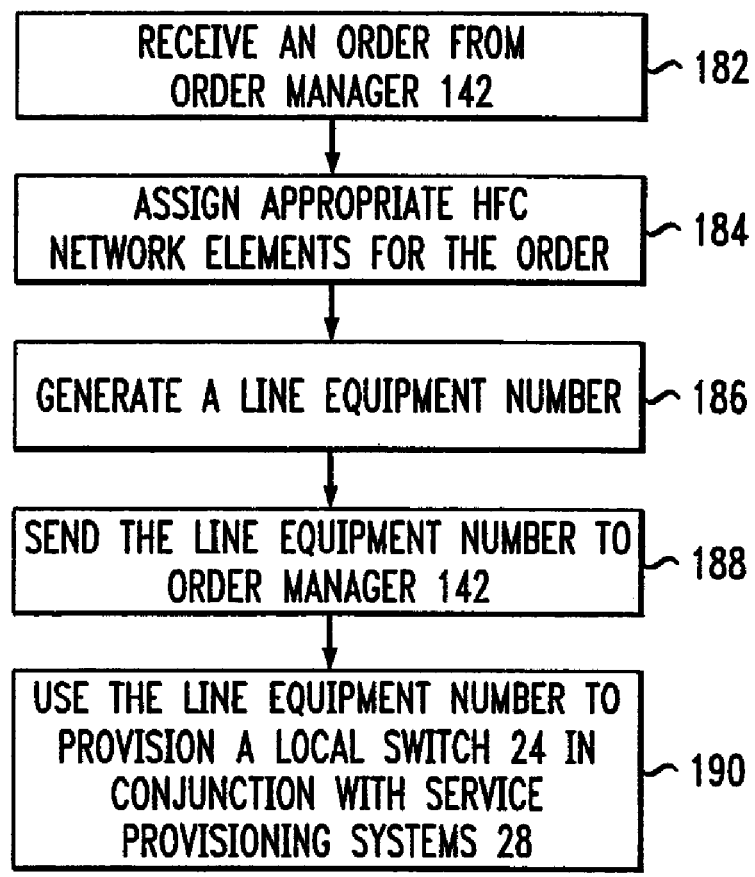
FIG. 9 illustrates a flow chart describing operation of the automation of HFC network provisioning in accordance with a preferred embodiment of the invention.

The first key network management function is the automation of HFC provisioning. For example, after a customer service representative 153 takes an order for telephony service provisioning of the telephony service begins. The provisioning of a customer's telephone service has two primary considerations. The first consideration is to provision a logical HFC circuit connecting the appropriate CPE 76 to the corresponding appropriate head end office (HDT 56). The second consideration is provisioning a local switch 24 that delivers dial tone and features. Automation of HFC network provisioning means without manual intervention. As shown in flowchart 180 of FIG. 9, this translates into receiving an order from an order manager 142 as shown in block 182, assigning appropriate HFC network elements for that order as shown in block 184, generating a line equipment number (LEN) as shown in block 186, and sending the LEN back to the order manager (as shown in block 188) that can use the LEN to provision the local switch in conjunction with service provisioning systems 28 as shown in block 190.

The HFC service provisioning includes the assignment of HFC network components as shown in block 184 to create a logical circuit connecting the CPE to the corresponding appropriate hub office equipment. This includes traversing the various coax bus, fiber node, fiber path, and hub office equipment. The automation of HFC provisioning depends on the HFC network configuration data being readily available. The database of SDI system 93 supports automated provisioning by storing existing HFC network topology. The database of SDI system 93 has the ability to maintain a referential integrity of network equipment, network connectivity, and logical service paths associated with customer services.

Order manager 142 provides workflow control for the ordering and interactions with other processes such as billing and dispatch provided by dispatch manager 42. SDI system 93 is notified of an order request via an interface with order manager 142. SDI system 93 will transfer the order request to HFC network manager 88 which in turn then interfaces to HDT network element manager 146. HDT network element manager 146 then executes the provisioning commands.

There are five separate areas that should be automated to achieve fully automated designs in SDI system 93. The first is order creation entry of order data into the database of SDI system 93 which is performed by an interface to order manager 142 for full automation. The second is design—selection of the components (NIU 76, HDT 56, etc.). The third is implementation—sending HDT/HEM to the HDT network element manager 146, sending the LEN to order manager 142, and test data (from the HDT network element manager). The fourth is interfaces for systems such as SDI system 93, HFC network manager 88 can take an SDI system request and turn it into a sequence of commands necessary for provisioning a particular service on a particular piece of equipment. The fifth is broadband development—sequences of HFC network manager 88 that allow a single calling point to execute desired functions such as add new service, modify existing service, and delete service. This is required for each desired function in each particular piece of equipment.

Referring now back to FIG. 8, the second key network management function is automated trouble ticket creation. The following is a list of capabilities for accomplishing the goal of auto trouble ticket creation: data feed from fault manager 90 into outage tables of trouble ticket system 102; integration with customer service representative tools for enhanced automated rules-based diagnostic testing, capture, and auto-population of diagnostic information into appropriate data fields; integration with SDI system 93 via HFC network manager 88 to provide wide-scale and drill down system outage alert and notification for enhanced trouble correlation; an interface to include simple diagnostic tool interface and auto trouble ticket generation/assignment based on diagnostic results and rules/tables.

The third key network management function is automated fault management. HFC status monitoring 144 of HFC network manager 88 monitors HFC network 12 for configuration and problem status. Similarly, network element manager 146 of HFC network manager 88 monitors service network element 56 (i.e., HDT, CMTS, and video equipment) for configuration and problem status. HFC network manager 88 generates alarm data if there are any problems. Fault manager 90 uses the alarm data in conjunction with the network configuration data stored in the database of SDI system 93 to generate a graphical display of the location and type of problems.

Figure 10:
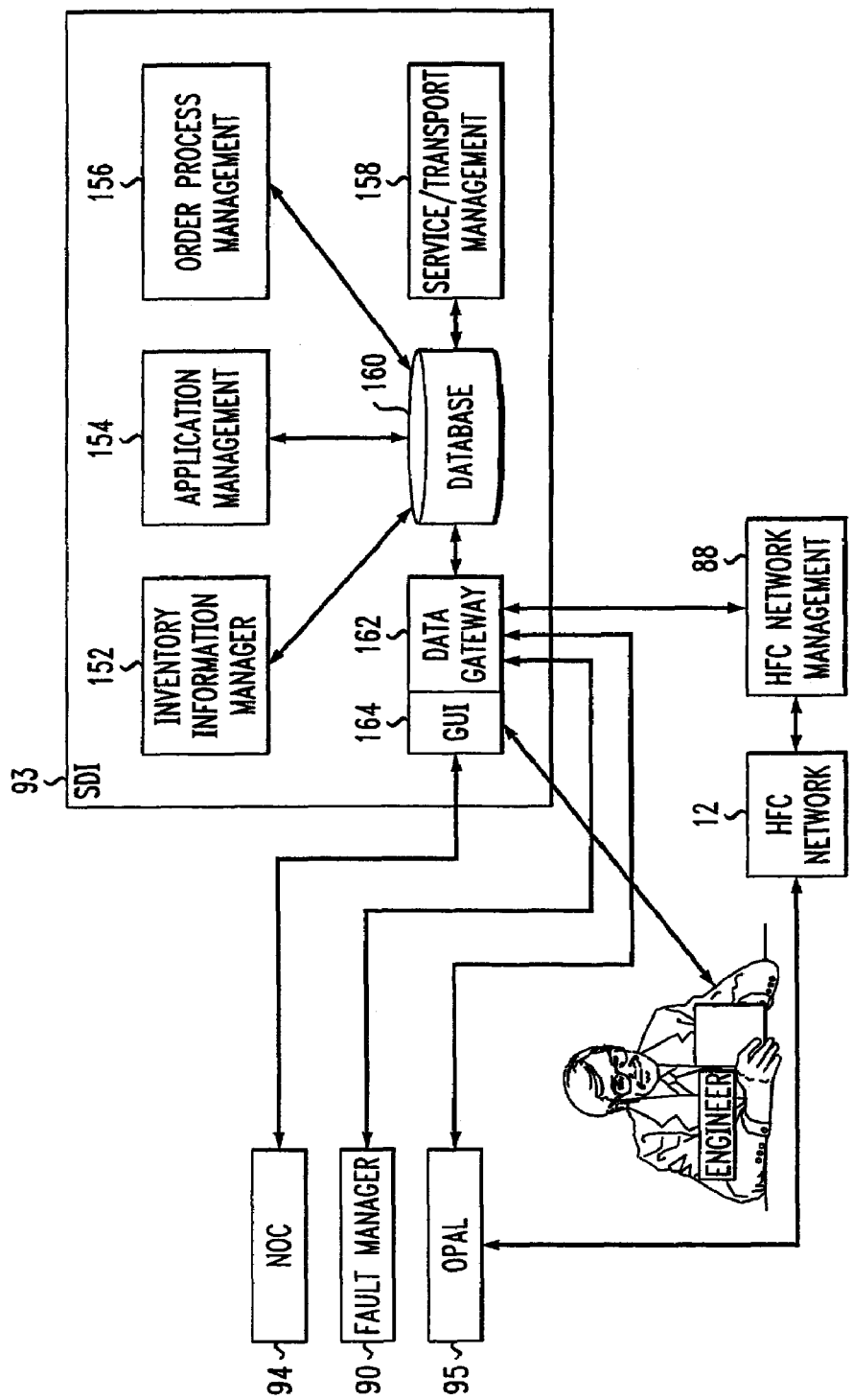
FIG. 10 illustrates a block diagram of the major subsystems of the service, design, and inventory (SDI) system in accordance with a preferred embodiment of the present invention.

FIG. 10 illustrates a block diagram of the major subsystems of SDI system 93. FIG. 10 illustrates the basic relationship between SDI system 93 and certain functionality as it pertains to managing HFC network 12. SDI system 93 includes inventory information management capabilities 152, application management capabilities 154, order process management capabilities 156, and service/transport design capabilities 158. All of these management and design capabilities interact with a database 160. Database 160 interacts with data gateway 162 via a GUI 164 to interact with NOC 94, fault manager 90, OPAL 95, and HFC network manager 88.

Inventory information management component 152 supports additions and changes to database 160 and enables tracking of the use and availability of HFC network elements and status through the use of queries and reports. Inventory information management component 152 also manages the physical inventory items and permits browsing and updating with respect to such items as: household passed address to coax bus and fiber node association; network element and CPE profile and location data; link data; routing data; customer data; and hub office data.

Service and transport design component 158, also referred to as the design management component, uses different types of data, e.g., data from database 160, data an operator enters about an order or a customer and customer interface definition data, to create and modify the design of HFC network 12. The design subsystem is provided with an automated provisioning capability that, together with GUI 164, permits an operator to see HFC network 12 grow as each link is created.

Order process management component 156 tracks all orders, from first contact to a moment when a link goes into service, including management of scheduling, jeopardy information, and order status. A number of order management features support the design management subsystem such as: creating, querying, and listing new connect, change, and disconnect orders; validating order entry data; translating orders into attribute requirements for the design process; generating a schedule of activities and intervals based on service type, order action, expedite, and sub-networks; and tracking the completion of scheduled activities against objective intervals. Application management component 154 permits customizing SDI system 93 through various rule and translation tables.

Thus it is apparent that there has been provided, in accordance with the present invention, a method and system for providing an efficient use of HFC network resources that fully satisfy the objects, aims, and advantages set forth above. It is to be understood that the network management system in accordance with the present invention may be used to manage other broadband networks providing multiple services such as fixed wireless networks. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. In a broadband network having a hybrid fiber coax (HFC) network having network elements operable for communicating telephony, data, and video signals with customer-premises equipment (CPE) of subscriber households, the network elements including a host digital terminal (HDT) for communicating the telephony signals, a cable modem termination system (CMTS) for communicating the data signals, and video equipment for communicating the video signals, a fiber optics network connecting the HDT, CMTS, and video equipment to a fiber optics node, and a coax cable network connecting the fiber optics node to the CPE of the subscriber households, an HFC network management system comprising:

a service, design, and inventory (SDI) system having a database operable for storing data indicative of an inventory of the network elements and the CPE in the HFC network and an inventory of CPE which are out of the HFC network, for storing data indicative of configuration and connectivity of the network elements and the CPE in the HFC network, and for storing data indicative of assigned capacity of the HFC network based on the configuration and the connectivity of the network elements and the CPE in the HFC network; and an online provisioning application link (OPAL) operable with the database of the SDI system for provisioning a CPE in the inventory of CPE which are out of the HFC network to be added into the HFC network and for provisioning network elements in the HFC network with the CPE added into the HFC network based on the assigned capacity of the network elements.

2. The HFC network management system of claim 1 wherein:

the data indicative of configuration and connectivity of the network elements includes data indicative of physical and logical connections between the network elements.

3. The HFC network management system of claim 1 wherein:

the data indicative of configuration and connectivity of the network elements includes data indicative of physical and logical connections between the HFC network and the CPE.

4. The HFC network management system of claim 1 wherein:

the SDI system is operable to generate an SDI system report for at least one of a network element and a CPE, the SDI system report including information about the at least one network element and the CPE.

5. The HFC network management system of claim 1 wherein:

the data indicative of an inventory of the network elements and the CPE in the HFC network includes data indicative of subscriber households passed in the HFC network.

6. The HFC network management system of claim 5 wherein:

the data indicative of subscriber households passed in the HFC network includes for each subscriber household data indicative of the fiber node connected to the CPE of the subscriber household and the coax bus connecting the subscriber household to the fiber node.

7. The HFC network management system of claim 6 wherein:
the data indicative of subscriber households passed in the HFC network further includes for each subscriber household data indicative of household key, household address, and household location.

8. The HFC network management system of claim 1 wherein:
the data indicative of an inventory of the network elements and the CPE in the HFC network includes data indicative of physical location and identification of the network elements.

9. The HFC network management system of claim 1 wherein:
the data indicative of an inventory of the network elements and the CPE in the HFC network and an inventory of the CPE which are out of the HFC network includes data indicative of profiles of the network elements and the CPE.

10. The HFC network management system of claim 1 further comprising:
an HFC network manager operable for controlling the configuration and connectivity of the network elements and the CPE in the HFC network, wherein the database of the SDI system updates the stored data indicative of the configuration and the connectivity of the network elements and the CPE in the HFC network in response to the HFC network manager changing the configuration and the connectivity of the network elements and the CPE in the HFC network.

11. The HFC network management system of claim 1 further comprising:
a fault manager having an alarm visualization tool operable with the database of the SDI system for generating visual displays of the configuration and the connectivity of the network elements and the CPE in the HFC network.

12. A hybrid fiber coax (HFC) network management method for use in a broadband network having a HFC network provided with network elements operable for communicating telephony, data, and video signals with customer-premises equipment (CPE) of subscriber households, the network elements including a host digital terminal (HDT) for communicating the telephony signals, a cable modem termination system (CMTS) for communicating the data signals, and video equipment for communicating the video signals, a fiber optics network connecting the HDT, CMTS, and video equipment to a fiber optics node, and a coax cable network connecting the fiber optics node to the CPE of the subscriber households, the HFC network management method comprising:
storing, in a database, data indicative of an inventory of the network elements and the CPE in the HFC network and an inventory of CPE which are out of the HFC network;
storing, in the database, data indicative of configuration and connectivity of the network elements and the CPE in the HFC network;
storing, in the database, data indicative of assigned capacity of the HFC network based on the configuration and the connectivity of the network elements and the CPE in the HFC network; and
accessing, by an online provisional application link (OPAL), the data stored in the database in order for the OPAL to provision a CPE in the inventory of CPE which are out of the HFC network to be added into the HFC network and to provision network elements in the HFC network with the CPE added into the HFC network based on the assigned capacity of the network elements.

13. The HFC network management method of claim 12 wherein:
storing, in the database, data indicative of configuration and connectivity of the network elements includes storing data indicative of physical and logical connections between the network elements.

14. The HFC network management method of claim 12 wherein:
storing, in the database, data indicative of configuration and connectivity of the network elements includes storing data indicative of physical and logical connections between the HFC network and the CPE.

15. The HFC network management method of claim 12 further comprising:
generating an SDI system report for at least one of a network element and a CPE, the SDI system report including information about the at least one network element and the CPE.

16. The HFC network management method of claim 12 wherein:
storing, in the database, data indicative of an inventory of the network elements and the CPE in the HFC network includes storing data indicative of subscriber households passed in the HFC network.

17. The HFC network management method of claim 16 wherein:
storing, in the database, data indicative of subscriber households passed in the HFC network includes storing for each subscriber household data indicative of the fiber node connected to the CPE of the subscriber household and the coax bus connecting the subscriber household to the fiber node.

18. The HFC network management method of claim 12 wherein:
storing, in the database, data indicative of an inventory of the network elements and the CPE includes storing data indicative of physical location and identification of the network elements.

19. The HFC network management method of claim 12 wherein:
storing, in the database, data indicative of an inventory of the network elements and the CPE in the HFC network and an inventory of the CPE which are out of the HFC network includes storing data indicative of profiles of the network elements and the CPE.

20. The HFC network management method of claim 12 further comprising:
generating visual displays of the configuration of the network elements and the CPE in the HFC network.

21. The HFC network management method of claim 12 further comprising:
controlling the configuration and connectivity of the network elements and the CPE in the HFC network; and
updating the stored data indicative of the configuration of the network elements and the CPE in the HFC network in response to the HFC network manager changing the configuration and the connectivity of the network elements and the CPE in the HFC network.

* * * * *